United States Patent
Parthasarathy

(10) Patent No.: US 10,913,664 B2
(45) Date of Patent: Feb. 9, 2021

(54) QUICK RESPONSE SYSTEM AND METHOD FOR REMOVING VOLATILE COMPOUNDS FROM CONTAMINATED WATER

(71) Applicant: Harikrishnan Parthasarathy, Flowery Branch, GA (US)

(72) Inventor: Harikrishnan Parthasarathy, Flowery Branch, GA (US)

(*) Notice: Subject to any disclaimer, the term of this patent is extended or adjusted under 35 U.S.C. 154(b) by 0 days.

(21) Appl. No.: 16/390,973

(22) Filed: Apr. 22, 2019

(65) Prior Publication Data
US 2020/0331773 A1    Oct. 22, 2020

(51) Int. Cl.
| | | |
|---|---|---|
| C02F 1/20 | (2006.01) | |
| B01D 3/34 | (2006.01) | |
| B01D 5/00 | (2006.01) | |
| B01D 53/18 | (2006.01) | |
| C02F 101/32 | (2006.01) | |
| C02F 103/36 | (2006.01) | |

(52) U.S. Cl.
CPC ............... C02F 1/20 (2013.01); B01D 3/346 (2013.01); B01D 5/006 (2013.01); B01D 5/0093 (2013.01); B01D 53/18 (2013.01); *C02F 2101/322* (2013.01); *C02F 2103/365* (2013.01)

(58) Field of Classification Search
CPC ... C02F 1/04; C02F 1/20; B01D 3/346; B01D 5/006; B01D 5/0093
See application file for complete search history.

(56) References Cited

U.S. PATENT DOCUMENTS

| | | | | |
|---|---|---|---|---|
| 4,236,973 A | * | 12/1980 | Robbins | B01D 3/343 203/10 |
| 4,526,692 A | * | 7/1985 | Yohe | C02F 1/645 210/747.7 |
| 4,670,278 A | * | 6/1987 | Healey | A23B 7/02 202/186 |
| 4,892,664 A | * | 1/1990 | Miller | B01D 53/8668 166/267 |
| 5,069,796 A | * | 12/1991 | Fox | C02F 1/20 210/110 |
| 5,176,798 A | * | 1/1993 | Rodden | B01D 3/26 202/159 |
| 5,294,303 A | * | 3/1994 | Robbins | B01D 3/007 202/205 |
| 5,352,335 A | * | 10/1994 | Beaver | B01D 3/34 202/182 |

(Continued)

*Primary Examiner* — Jonathan Miller
(74) *Attorney, Agent, or Firm* — Carlo Julio Salas Martinez; Smith Tempel Blaha LLC

(57) ABSTRACT

The quick response system and method for removing volatile compounds from contaminated water disclosed herein may comprise, at least, a preconditioning stage, a stripping stage, a condenser stage, a refrigeration stage, and a scrubber stage. The present invention relates to a portable system and method that can be deployed on an emergency or quick response basis to purify aqueous streams containing volatile organic compounds (VOC) and chlorinated hydrocarbons, collectively volatile compounds (VC), emitted from petroleum and chemical processing facilities. The system allows manufacturing facilities having internal cleanup issues to become compliant with environmental standards and guidelines quickly. Once the issues in the petroleum facility are fixed, this method can be demobilized and removed from the site in a short period of time.

2 Claims, 1 Drawing Sheet

(56) References Cited

U.S. PATENT DOCUMENTS

| | | | | |
|---|---|---|---|---|
| 6,237,352 B1 * | 5/2001 | Goodchild | ........... | B01D 5/0039 |
| | | | | 62/196.4 |
| 6,684,648 B2 * | 2/2004 | Faqih | ..................... | B01D 5/009 |
| | | | | 62/93 |
| 7,225,620 B2 * | 6/2007 | Klausner | ................ | B01D 3/346 |
| | | | | 60/641.1 |
| 8,052,763 B2 * | 11/2011 | Gallot | .................. | B01D 1/0047 |
| | | | | 23/295 R |
| 2012/0292176 A1 * | 11/2012 | Machhammmer | ....... | B01D 1/14 |
| | | | | 203/10 |
| 2016/0096744 A1 * | 4/2016 | Rutsch | ................ | B01D 1/0058 |
| | | | | 159/16.1 |

\* cited by examiner

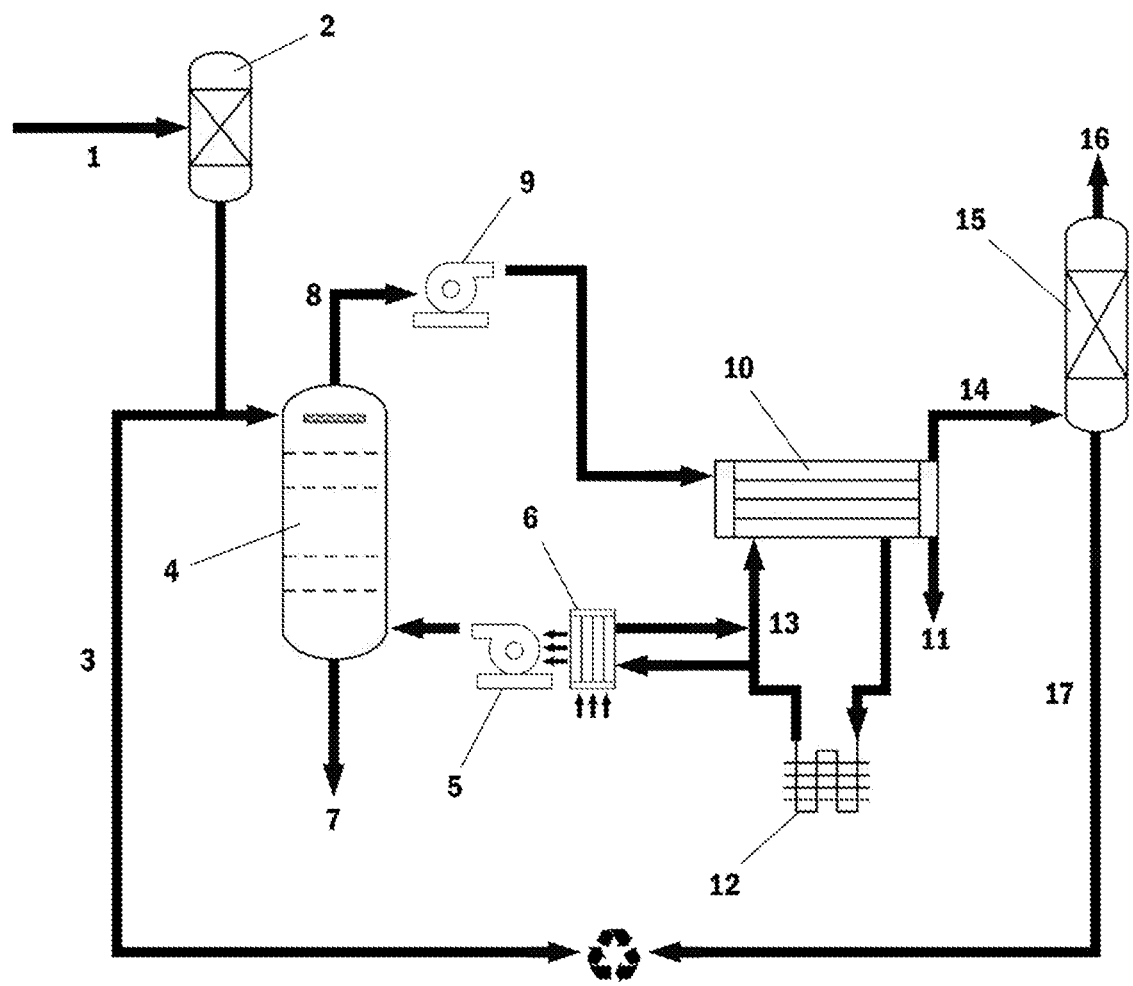

QUICK RESPONSE SYSTEM AND METHOD FOR REMOVING VOLATILE COMPOUNDS FROM CONTAMINATED WATER

TECHNICAL FIELD OF THE INVENTION

The present invention relates in general to filtration systems, and, more specifically, to a quick response system and method for removing volatile compounds from contaminated water.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Petroleum refining involves a number of processes and facilities, which may be known as refineries, to convert crude oil into useable products such as petroleum gas, gasoline, kerosene, and diesel. Petroleum refineries tend to comprise large industrial complexes having a number of different processing units and support facilities. Often found among these processing units are crude oil distillation units, catalytic reforming units, alkylation units, and various gas treatment units. The need for such varied processing units and auxiliary facilities is due to the processes involved in petroleum refining.

Petroleum is a naturally-occurring liquid found within the Earth's surface formed from decomposed organic material. Considered a fossil fuel, petroleum is formed when large quantities of dead organisms, such as zooplankton and algae, are buried underneath sedimentary rock and subjected to intense heat and pressure. Such liquid fuel is usually recovered from the Earth by drilling, since natural petroleum springs are rare, and the recovered liquid is then refined and separated by the process of distillation.

The crude oil distillation unit, which is a processing unit common to most petroleum facilities, comprises a fractional distillation tower that operates at above-atmospheric pressures. The crude oil is heated within this unit and separated, based on boiling points, into various fuels that are further treated in appropriate refining units. Though no waste products are theoretically produced by this distillation process, especially since the materials may be recycled or reprocessed in the refinery, the process of converting crude oil into useable fuels still generates a number of products that are harmful to the environment and human health.

A number of environmental impact studies have been conducted into the effects of oil refineries on their locales, all of which tend to determine that such refineries have a negative impact on the air, land, and water in their immediate environment. Air pollution, for example, may be emitted from the stacks at a refinery or from leaking equipment within the refinery. The land around the refinery can be polluted by the fallout from the air pollution or from any waste generated within the refinery that needs to be disposed of by dumping. Water pollution from refineries, which may be of greatest concern, can be caused by any discharging of chemicals or spilling of oil from the refineries, and can have an impact as far as the flow of water can carry the spilled products.

Of primary concern among these various pollutants is the emission of Volatile Organic Compounds (VOCs), which are organic chemicals having a high vapor pressure at room temperature and which are, thus, highly volatile. Benzene, toluene, ethylbenzene, and xylene, collectively known as BTEX, are a group of chemicals produced by the petroleum refining processing and are commonly found in water in the vicinity of petroleum deposits. Benzene, in particular, is a known carcinogen whose concentrations in water are highly regulated by various jurisdictions around the world. Australia, for example, requires that benzene not be detectable in water at more than 1 part per billion (ppb). The United States has actually set the maximum containment level goal for benzene at zero (0), though has an enforceable maximum level, considering costs and benefits, of 5 ppb.

One technology used in the removal of various VOCs from bodies of water may be known as the air stripper, which utilizes air to strip the volatile compounds from water on a tray or packed column, and converts the volatile compounds from the liquid phase to the gas phase. The exhaust air laden with the volatile compounds is then purified to produce VOC-free air by treating with thermal oxidation, incinerating, or filtering through activated carbon or zeolite beds. The process can be expensive and sometimes is not feasible in certain sites due to the high loading of hydrocarbons, inability to connect with an incinerator, the presence of water or moisture, or high temperatures. Such a device is also not portable, since it must be built into or as a part of a refinery facility.

Another technology used in the removal of VOCs from water is the use of carbon and zeolite adsorption media. Such media comprises activated granular or powdered carbon and zeolite media that adsorbs BTEX, styrene, and chlorinated hydrocarbon volatile compounds from aqueous streams and discharges clean water to the environment. The media has fixed adsorption capacity for the volatile hydrocarbons, and, once the media capacity is exhausted from use, it needs to be replaced with new or reactivated or regenerated beda for further use. This technology cannot be utilized as a standalone unit for such complex aqueous waste streams in manufacturing facilities. Also, such technology is not economically feasible for aqueous streams with oils, coke, suspended solids, or with high inlet loadings in the range of 5000 parts per million (ppm) concentration by weight of VOCs in the aqueous waste stream.

The process of steam stripping utilizes steam to strip the volatile compounds from the water or liquid phase and transfers the volatile compounds to the steam phase. A higher contact surface area of the mechanism results in the higher efficiency of volatile compound removal from the liquid or water phase into the steam phase. This process produces steam and condensate loaded with benzene and volatile hydrocarbons that need to be condensed by a condenser, and the remaining volatile compounds in the vapor phase must be cleaned prior to releasing into the environment. The exhaust vapor phase laden with the volatile compounds is treated by thermal oxidation, incinerating, or adsorbed in the vapor phase on activated carbon or zeolite beds. The condensate generated from steam condensing contains high concentrations of volatile hydrocarbons and needs to be disposed of as hazardous liquid waste. This technology is also not available as a portable or standalone system.

The device and process for removing volatile organic and inorganic compounds from polluted waters disclosed in U.S. Pat. No. 9,289,697 utilizes a stripping column implementing nitrogen gas for desorption of volatile compounds from water streams. The water stream is then discharged into the environment per environmental guidelines. The nitrogen gas loaded with VOCs is cryogenically cooled and the VOCs are condensed and separated to meet the clean air emission guidelines. Such a process, though, is negatively impacted by the presence of heavier insoluble oils, emulsions, suspended solids, and hydrocarbons in the water stream. The process is also highly energy intensive, due to cryogenic cooling and condensing, resulting in higher energy costs and costs of operation.

Thus, there is a need in the art for a quick response system and method for removing volatile compounds from contaminated water. Such a solution may be portable and may comprise a continuous and single pass method that can be deployed quickly when required by customers. The system may also have the ability to treat inlet loadings of up to 5000 ppm by weight of benzene and other VOCs in the aqueous waste streams of petroleum and chemical manufacturing facilities. The system may finally have the ability to output treated aqueous streams having VOC concentrations meeting or exceeding the most stringent environmental guidelines for VOCs in treated water streams.

It is to these ends that the present invention has been developed.

BRIEF SUMMARY OF THE INVENTION

To minimize the limitations in the prior art, and to minimize other limitations that will be apparent upon reading and understanding the present specification, the present invention describes a quick response system and method for removing volatile compounds from contaminated water.

It is an objective of the present invention to provide a quick response system and method for removing volatile compounds from contaminated water that may comprise a preconditioning stage.

It is another objective of the present invention to provide a quick response system and method for removing volatile compounds from contaminated water that may comprise a stripping stage.

It is another objective of the present invention to provide a quick response system and method for removing volatile compounds from contaminated water that may comprise a condenser stage.

It is another objective of the present invention to provide a quick response system and method for removing volatile compounds from contaminated water that may comprise a refrigeration stage.

It is another objective of the present invention to provide a quick response system and method for removing volatile compounds from contaminated water that may comprise a scrubber stage.

It is another objective of the present invention to provide a quick response system and method for removing volatile compounds from contaminated water that may comprise a mobile system.

It is another objective of the present invention to provide a quick response system and method for removing volatile compounds from contaminated water that may comprise a standalone system.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the FIGURES have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1 schematically presents an overview of a quick response system and method for removing volatile compounds from contaminated water, as contemplated by the present disclosure.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention relates to a portable system and method that can be deployed on an emergency or quick response basis to purify aqueous streams containing volatile organic compounds (VOC) and chlorinated hydrocarbons, collectively volatile compounds (VC), emitted from petroleum and chemical processing facilities.

These VC-contaminated streams are generated as waste product during the manufacturing processes of olefins, aromatics, methyl tertiary-butyl ether (MTBE), chlorinated hydrocarbons, and other petroleum processes at relevant manufacturing facilities. These waste products are considered both toxic and carcinogenic chemical compounds, and are regulated in pollutant discharges to surface waters and air as hazardous waste. In addition to the waste products, the aqueous streams may also contain other contamination like coke, soot, tar, asphaltenes, and heavy and light oils, all of which add to the complexity of purification.

Such VC-contaminated aqueous streams generated from manufacturing facilities can benefit from the present method, which can be deployed on an emergency basis since it is a portable and standalone skid-mounted or trailer-mounted system. The system allows manufacturing facilities having internal cleanup issues to become compliant with environmental standards and guidelines quickly. Once the issues in the petroleum facility are fixed, this method can be demobilized and removed from the site in a short period of time.

The illustration of FIG. 1 illustrates a quick response system and method for removing volatile compounds from contaminated water, as contemplated by the present disclosure. The method of deploying such a system comprises, generally, a preconditioning step 2, a VC stripping step 3, a dense air injection process 4, a pressure booster blower 6, a condenser 7, and a vapor scrubbing step 11.

This is a standalone treatment method that does not need to be connected to the facility flare, incinerator, or thermal oxidizer. It presents a lower overall cost than alternate options for purifying aqueous streams to 0.05 ppm levels of benzene, 0.02 ppm toluene, 0.142 ppm ethylbenzene, 0.5 ppm styrene and 0.05 ppm of chlorinated hydrocarbons even at high inlet concentrations of up to 5000 ppm of these chemicals in aqueous streams.

The system also has 95% lower waste generation side effect than using an activated carbon filtration method. The method does not increase nitrous oxide (NOX) or sulfur oxide (SOX) emissions and also produces valuable liquid hydrocarbon oil byproducts that can be reused as fuel 9 or sold as a product 12.

In more detail, the quick response system and method for removing volatile compounds from contaminated water may comprise a portable, standalone system that may be installed onto any appropriate sled or trailer device. Such a device may comprise, in one embodiment, a standard semi-trailer, which is a trailer without a front axle intended to be pulled by a tractor unit. By way of example, a semi-trailer in the United States may be a box trailer having an enclosed rectangular area usually 45 feet to 53 feet in length, though they can range from 28 feet to 57 feet. In another embodiment the semi-trailer may comprise a proprietary design. The entirety of the system may be contained within or on such a trailer device so that it may be pulled to a location where the system may be implemented, and removed from the location when the system is no longer needed.

The trailer device housing the quick response system and method for removing volatile compounds from contaminated water may be placed alongside a stream or other body of water contaminated with volatile compounds. An appropriate means for diverting water into the system, such as an inlet pipe or feed ramp, may be placed into the body of water. The means for diverting water may operate by allowing the force of movement of the body of water to push contaminated water into the system, or may further comprise a fluid pump for pulling water into the system. The contaminated water entering the system may be termed inlet water 1. The inlet water 1 may be contaminated by any relevant volatile compounds such as, for example, benzene, toluene, ethylbenzene, xylene, styrene, or chlorinated hydrocarbons, and may be additionally contaminated by, for example, crude oil, oil products, and suspended solids. The inlet water 1 pH may be altered by these contaminants and may range from a pH 2 to pH 14, and the temperature of the inlet water 1 may range, based on contamination and environmental factors, from 33 degrees Fahrenheit (° F.) to 212° F. This inlet water 1 may be fed initially into a preconditioning stage 2.

The preconditioning stage 2 may be installed within or on the trailer device of the quick response system and method for removing volatile compounds from contaminated water, and may comprise a plurality of filtration and separation media for preconditioning of the inlet water 1. The preconditioning stage 2 may reduce the risk of fouling the subsequent stages of the system by filtering out large particles and debris not otherwise processed by the system, and may further filter out oil and hydrocarbons 3 not requiring processing or decontamination by the system. Such filtered oil and hydrocarbons 3 may be mixed with spent solvent 17 (discussed below) discharged by the system for recycling. The inlet water 1 filtered through the preconditioning stage 2 may then be sent to a stripping stage 4, and the action of the preconditioning stage 2 may prevent the stripping stage 4 from encountering efficiency losses of up to 50%.

The stripping stage 4 may be installed within or on the trailer device of the quick response system and method for removing volatile compounds from contaminated water, and may comprise a single pass continuous stripping process for removing volatile compounds from the inlet water 1. Such volatile compounds may include, for example, benzene, toluene, ethylbenzene, xylene, styrene, or chlorinated hydrocarbons contaminating the inlet water 1, and the stripping means may be any means appropriate to the removal of one or more of these volatile compounds. The surface area of the stripping means, including the number of trays used and the form factor of the packaging, may vary based on the desired inlet and outlet rates of the particular embodiment. In this way a smaller stripping stage 4 and, thus, a smaller overall system, may be used in smaller or less polluted environments while a larger stripping stage 4 and, thus, a larger overall system, may be used in more polluted environments. The stripping stage 4 may further filter out oil and hydrocarbons 3 and other suspended solids in the inlet water 1. The stripping medium used by the stripping means may be any appropriate medium such as, for example, air or other inert gasses.

In an embodiment wherein the stripping medium used is air, an air pump 5 may be used to supply the air stripping medium at an appropriate volume, pressure, and rate of flow, which may be measured in cubic feet per minute (cfm). The air pump 5 may further comprise a pump air cooler 6, which may cool the air stripping medium prior to its pumping by the air pump 5. This cooling of the air stripping medium increases its density and improves the stripping efficiency of the medium against volatile compounds. Air stripping medium pumped at ambient temperatures, between 80° F. to 110° F., is shown to have an cfm rate of approximately 8% less than than air stripping medium pumped between 60° F. and 70° F. Without the pump air cooler 6 the air pump 5 would necessarily comprise a larger or higher capacity pump, also having higher maintenance demands, to compensate for the decreased efficiency of the air stripping medium. The pump air cooler 6 further allows the quick response system and method for removing volatile compounds from contaminated water to retain its efficiency in environments where the ambient temperature is greater than optimal for sourcing the air stripping medium.

In an embodiment wherein the stripping medium used is an inert gas such as, for example, low pressure nitrogen, the stripping medium may be pre-cooled or may be stored in a separate subsystem for use by the system, and may not require a pump air cooler 6. In any embodiment the stripping medium is flowed against the current of the inlet water 1 so as to maximize the efficiency of the stripping process. The inlet water 1, during processing, may be subjected to a greater than 99% reduction of volatile compound contaminants, with environmental discharge objectives of 0.05 ppm levels of benzene, 0.02 ppm toluene, 0.142 ppm ethylbenzene, 0.5 ppm styrene, and 0.05 ppm of chlorinated hydrocarbons. Such decontaminated water may be termed output water 7, and may be released from the system back into the environment.

The stripping medium now contaminated with volatile compounds may be termed exhaust air 8, and may be passed through a coalescing medium in the stripping stage 4 to filter out any remaining moisture before being sent to a condenser stage 10 for further processing. The condenser stage 10 may implement a cooling of the exhaust air 8, which may result in an increase in its density and a slowing of its velocity through the system, so a compressor 9 may be installed in the stream of the exhaust air 8 prior to the condenser stage 10. The compressor 9 may serve to accelerate or to maintain the flow velocity of the exhaust air 8 through the condenser stage 10.

The condenser stage 10 may be installed within or on the trailer device of the quick response system and method for removing volatile compounds from contaminated water, and may comprise an air-to-air or air-to-water cooling system such as, for example, an air-cooled radiator or a water-cooled radiator. The condenser stage 10 may serve to cool the exhaust air 8 so that condensable contaminants 11 may be removed from the exhaust air 8 for recycling.

The cooling of the condenser stage 10 may be accomplished by a refrigeration stage 12 pumping a coolant 13 through the condenser stage 10. The coolant 13 may comprise any appropriate coolant such as, for example, water, propylene glycol, or brine, and may be contained within a closed subsystem. The condenser 10 may transfer heat from the exhaust air 8 to the coolant 13, thus cooling the exhaust air 8 and heating the coolant 13, and the refrigeration stage 12 may then cool the coolant 13 for reuse. The coolant 13 may also be used to cool the air stripping medium supplied by the pump air cooler 6 to the air pump 5. As contemplated by the present disclosure, the refrigeration stage 12 may maintain a coolant 13 temperature between −40° F. and 85° F.

As the exhaust gas 8 is passed through the condenser stage 10 it is cooled and condensable contaminants 11 are separated out. The remaining gas may be termed condensed gas 14 and may still contain residual volatile compounds that cannot be discharged into the environment. Such condensed gas 14 may then be sent to a scrubber stage 15 for final processing.

The scrubber stage 15 may be installed within or on the trailer device of the quick response system and method for removing volatile compounds from contaminated water, and may comprise a stage utilizing any appropriate solvents for scrubbing volatile compounds from the condensed gas 14. Such solvents may include, for example, organic solvents like low sulfur diesel, kerosene, jet fuel, dipentenes, biodiesel, vegetable oils, oils with alkyl esters, and oils from citrus fruit peels, inorganic solvents, or any combination thereof. The solvents may vary, as needed, based on the desired volatile compound filtration sought, and may be varied based on the needs of the particular environment or cleanup project.

The residual volatile compounds in the condensed gas 14 are bubbled through a solvent column in the scrubber stage 15. The efficiency of volatile compound removal ranges from 60% to 99.9%, depending on the solvent chosen, the available surface area for scrubbing, the amount of available solvent, the flow rate of condensed gas 14, ambient temperatures, and environmental regulations. The solvent in the scrubber stage 15 may be cooled to improve the efficiency of solvent scrubbing and to reduce reintroduction of benzene into the condensed gas 14. The solvent may also be circulated through spray nozzles in the scrubber stage 15 where the solvent sprays on the gas bubbling out of the solvent column. This may improve the efficiency of scrubbing and the mass transfer of volatile compounds into the solvent.

Once the condensed has 14 has been finally scrubbed it may be released into the environment as output air 16. The spent solvent 17, which may now contain volatile compounds as well as various fuel oils, may be recycled by the system, used as fuel by the system, may be mixed with or filtered oil and hydrocarbons 3 discharged by the system for recycling.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A system for removal of volatile compounds from oil contaminated water or suspended-solid contaminated water produced as by-product, runoff, or emission from petroleum or chemical manufacturing facilities, the system being a quick response, transportable, stand-alone system relative to the petroleum or chemical manufacturing facilities, the system comprising:
   a) a trailer for implementing the system;
   b) an input inlet for receiving a contaminated water into the system;
   c) a preconditioning subsystem comprising a plurality of filtration and separation media configured to remove particles and debris from the contaminated water;
   d) a stripping subsystem configured to receive the preconditioned water and configured as a multi-tray gas-liquid contactor comprising a blower, a cooling subsystem, and an air or inert gas stripping medium, the blower for targeted and adjustable volumetric flow rate or gas-flow rate, and gas-pressure, wherein the multi-tray gas-liquid contactor has an enclosed space with volume no greater than that defined by length dimensions not exceeding about 57 feet, width dimension not exceeding about 9 feet, and a height dimension not exceeding about 12 feet, whereby surface area of gas-liquid contact within the multi-tray contactor is packed within the enclosed space of the stripping subsystem, and wherein the air or inert gas stripping medium is cooled and pumped counter-current through the multi-tray contactor, such that vapor liquid mass transfer of the volatile compounds occurs between the preconditioned water and an exhaust gas, concentrating the transferred volatile compounds in the exhaust gas and yielding a decontaminated water stream;
   e) a compressor configured as a booster blower for accelerating, or at least maintaining, the target volumetric flow rate or gas-flow rate of the exhaust gas as it flows out of the multi-tray contactor and through the remainder of the system;
   f) a condensing subsystem configured to receive the exhaust gas from the stripping subsystem and configured to cool the exhaust gas via an air-cooled or water-cooled, indirect or direct, refrigeration sub-system, wherein the exhaust gas is passed through the condensing subsystem and cooled such that condensable volatile compounds concentrated in the exhaust gas precipitate out from the cooled exhaust gas; and g) a scrubbing subsystem configured to receive the cooled exhaust gas from the condensing subsystem and configured as a gas-liquid contactor comprising a scrubbing solvent through which the cooled exhaust gas is percolated, wherein the cooled exhaust gas is forced through or into contact with the scrubbing solvent such that volatile compounds remaining in the cooled exhaust gas are concentrated in the scrubbing solvent to yield a decontaminated gas.

2. The system for removal of volatile compounds of claim 1, wherein the scrubbing solvent of the scrubbing subsystem is selected from a group consisting of low sulfur diesel, kerosene, jet fuel, dipentenes, biodiesel, vegetable oil, oils with alkyl esters, oils from citrus fruit peels, inorganic solvents, or any combination thereof.

* * * * *